July 15, 1941.　　O. W. JOHNSON　　2,249,210
SAFETY DEVICE FOR UNLOADING PLOWS FOR EXTRACTORS
Filed May 5, 1938　　2 Sheets-Sheet 1
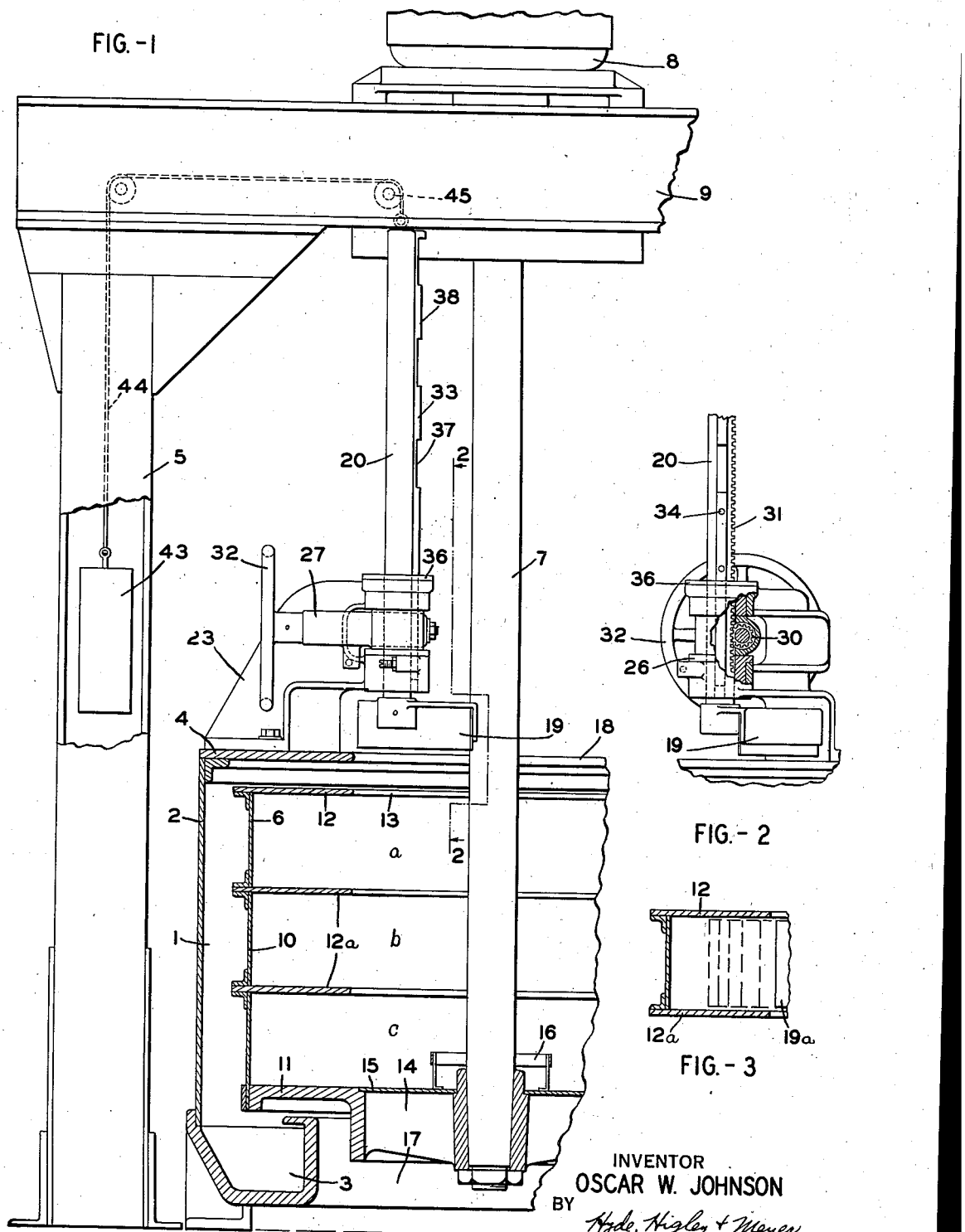

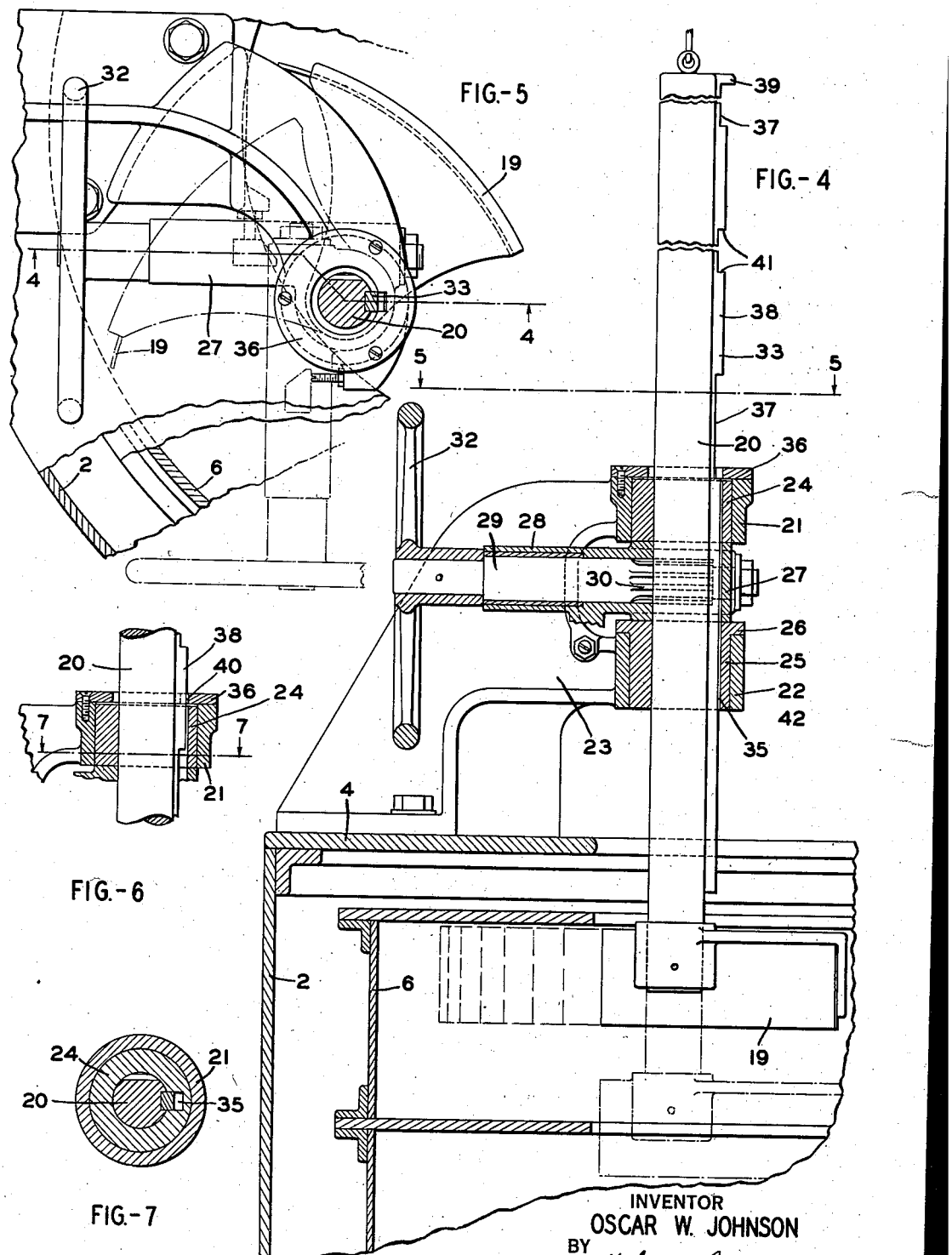

Patented July 15, 1941

2,249,210

UNITED STATES PATENT OFFICE 2,249,210

SAFETY DEVICE FOR UNLOADING PLOWS FOR EXTRACTORS

Oscar W. Johnson, Rochester, N. Y., assignor to The American Laundry Machinery Company, Cincinnati, Ohio, a corporation of Ohio Application May 5, 1938, Serial No. 206,144

5 Claims. (Cl. 210—70)

This invention relates to unloading devices for centrifugal extractors of the type used in separating liquids from solids of granular or other form capable of being unloaded by plow or similar action. Typical instances are the separation of liquid from solid chemical products, crystallized sugar from water in which it is supended, or finely divided food products from liquids.

The invention has more particular relation to the unloading device, which usually, while within the basket, is movable into and out of unloading position, the invention having for its object to prevent actual engagement of the unloading device or its supporting means with any surface or surfaces of the basket in which the material is collected, such as the basket bottom, or the top or other rings of the basket which serve as walls defining the collecting zone or zones.

A further object of the invention is to provide improved mechanism of this kind in which the unloading device is of plow form intended to be moved outwardly into and out of unloading position and is carried by a shaft, so that the unloading device is movable both axially between the top and bottom of the basket and inwardly and outwardly toward and from unloading position, the invention providing means for preventing engagement of the unloading device with any portion of the basket during the unloading operation.

Further objects of the invention are in part obvious and in part will appear more in detail hereinafter.

In the drawings, Fig. 1 represents a front elevation of one form of mechanism embodying the invention, the basket and casing being shown in sectional elevation; Fig. 2 is a detail view of the plow or unloading mechanism looking in the direction of the arrows, Fig. 1, parts being shown in section; Fig. 3 is a detail sectional view of a portion of a basket, with a wide unloading device or plow therein; Fig. 4 is an enlarged view of the plow and basket mechanism, parts being shown in section on the line 4—4, Fig. 5; Fig. 5 is a sectional plan view taken on the line 5—5, Fig. 4, the plow mechanism being shown in full lines in inoperative or retracted position and in dash-dot lines in advance unloading or operating position; Fig. 6 is a detail sectional elevation of a part of the interlocking key mechanism, the section corresponding to that of Fig. 4, but showing the parts in another position; and Fig. 7 is a sectional plan view on the line 7—7, Fig. 6.

While the invention may be applied to any form of extractor, the drawings, for convenience, illustrate an extractor of over-driven type, comprising a relatively stationary curb or casing 1 having an outer wall 2, a bottom drain trough 3 leading to an outlet (not shown) and a top wall 4. 5 indicates a suitable frame supporting the basket 6 within the casing, said basket being shown as attached to a shaft 7 driven in any suitable manner, such as by motor 8, and supported by and suspended from the overhead portion 9 of the frame 5.

The basket may be of any suitable form, its outer cylindrical wall 10 being either perforate or imperforate. When perforate, a part at least of the liquid passes out through the perforations, and when imperforate the material collecting space in the basket is defined within its wall 10 by the bottom 11 and an inwardly extending top ring 12, it being understood that when the basket is imperforate the liquid collected flows out through the basket opening 13 and thence outwardly and downwardly to the collecting trough 3 in the curb, as is usual. As shown the basket bottom is provided with a discharge opening 14 normally closed by a cover 15 which may be lifted by a handle 16 to expose the opening and enable the solid material scraped up by the unloading device to be discharged downwardly through the bottom opening 17 in the curb for collection. The material to be extracted, consisting of a mixture of liquid and solid materials, may be delivered to the extractor in any suitable manner through the curb opening 18 and basket opening 13 from a pipe, chute, conveyor, receptacle or the like not shown.

The unloading mechanism is of the usual plow form including a scraping or plowing blade 19 so mounted as to be capable of axial movement parallel to the axis of rotation into and out of the basket or to various positions therein, and also capable of horizontal movement back and forth between an inner retracted or inoperative position and an outer operating or unloading position shown respectively in full and dot-dash lines, Fig. 5. These movements may be made possible by mounting the unloading device in any suitable manner. As shown, it is attached to the lower end of a shaft 20 mounted to turn in upper and lower bearings 21, 22 in the arms of a fixed bracket 23 mounted on the curb 4. Between the bearings and the shaft are mounted upper and lower sleeves 24, 25, the lower of which has a flange 26 on top of its bearing. These sleeves always turn with the shaft, as will appear, and between them is located a sleeved fitting 27 which also turns with the shaft and has a tubular lateral extension 28 in which is mounted a shaft 29 provided at its inner end with a pinion 30 engaging rack teeth 31 on the shaft and at its outer end with a hand wheel 32 for turning it. By rotating this wheel the shaft may be moved endwise or up and down both for the purpose of moving the unloading plow into and out of the basket space and also for traversing it up and down along the basket wall to scrape the material therefrom during the unloading operation. By using the wheel and tube 28 as a handle, the fitting 27 may be rotated about the shaft axis to turn the shaft and thereby swing the unloading plow to and fro between its retracted and operating positions.

The in and out motions of the unloading device produced by swinging member 27 are the result of the connection of the shaft to the tube 27 by a key, which is shown as a long bar 33 fastened by screws 34 in a longitudinal slot of the shaft and engaging in keyways 35 in members 24, 25 and 27.

The unloading plow or blade may have a width equal to approximately (slightly less than) the full height of the material collecting space within the basket or one of the zones or spaces therein, if more than one, so that the unloading operation merely involves gradual outward movement of the plow, nearly into contact with the peripheral basket wall, until the material is practically all scraped away. Such an arrangement is shown in Fig. 3, where the scraping plow or blade 19a is the full height of the collecting space between the upper basket ring 12 and the next adjacent intermediate ring 12a. Figs. 1 and 4, however, show an arrangement in which the space between the basket bottom 11 and top ring 12 is subdivided by the intermediate rings 12a into three collecting zones a, b, c, and the plow or blade 19 is narrower than the width (vertically) across any one of said zones, so that full discharge of material from a zone requires traverse of the blade vertically across its width.

The present invention, in connection with or as an adjunct to an unloading device of this kind, involving a plow or blade movable both vertically and horizontally for the purposes described, has means for preventing engagement of the unloading means, such as the plow alone or any of its supporting parts, such as the shaft 20, with any surface of the basket bottom or top or said rings to which the solid material to be collected is exposed. That is to say, the present invention prevents any possibility of swinging the discharging plow or blade outwardly from its fully retracted position when it is horizontally opposite either the top ring 12 or either of the intermediate rings 12a and further prevents either upward or downward movement of said blade or plow when it is in operating or scraping position in any of the zones a, b, or c, sufficient to move it into contact with the lower surface of the top ring 12, the upper surface of the bottom 11 or either the top or bottom surfaces of the rings 12a.

I accomplish the foregoing results by special warded configuration of the key 33 so that it has cooperative relation with a plate 36 attached to the top of the bearing 21 and through an opening in which the shaft 20 slides. Key 33 is provided with a series, three being shown, of ward recesses 37 between which are full height projections 38, and above the upper recess 37 with a longer limiting projection 39. Even opposite the recesses 37 the key projects somewhat beyond the shaft surface so that no portion along its length is ever out of keyed relation with the sleeves 24, 25 and fitting 27, so that they are always compelled to rotate with the shaft.

The opening in plate 36 is extended at one side to form a key slot 40 through which the key slides. When any high portion of the key 33, such as the full height wards 38, is opposite or within the plate 36, rotation of the shaft 20 is prevented and the scraping blade or plow is prevented from being moved outwardly to a position where it might engage one of the rings 12 or 12a. However, when a ward recess 37 is within or opposite to the plate 36, the reduced height of the key permits the shaft to be freely rotated to move the plow outwardly into operating position.

Obviously, if the width of the plow is equal to the full height of the basket or one of the collecting zones a, b or c, as in Fig. 3, the length of the ward recess 37 should be just a very little more than the thickness of the plate 36, to permit the plate to enter the recess but preventing any vertical motion of the shaft when the plow is in operating position. However, when the width of the scraping plow is less than the height of the basket or of one of said zones, as in Figs. 1 and 4, the ward recesses 37 must be of increased length, the shoulders 41 at the ends of said spaces being spaced apart by approximately the difference between the width of the plow blade and the width across the zone of its operation.

The upper projection 39 forms a limiting stop which engages the top of the plate 36 and cannot pass below it, even through the key slot. This projection is so located as to prevent the plow or the end of the shaft from contacting with the basket bottom.

Usually the weight of the unloading parts, such as of shaft 20 and plow 19, is counterbalanced by a weight 43 connected to the shaft by a flexible band 44 travelling over pulleys 45.

With this arrangement, when the extracting operation is complete, the bottom cover 15 may be raised and the unloading plow introduced into the basket space by rotation of shaft 29. The stop 39 limits downward motion of shaft 20 and prevents it or the plow from engaging the basket bottom. Whenever the plow is opposite to any one of the rings 12 or 12a, the high wards 38 of the key 33 lock the shaft against rotation and thereby prevent outward motion of the plow from its retracted inoperative position. But when the plow is opposite to the collecting space in the basket or any zone thereof, a low ward recess 37 is opposite to plate 36 and rotation of the shaft is permitted, so that the plow can be moved outward to operating position. With the basket rotating, therefore, the plow scrapes off the material causing it to move inwardly toward the center where it passes out through the now exposed discharge opening 14.

What I claim is:

1. A centrifugal extractor, comprising a stationary curb, a rotatable basket having an inwardly extending ring, a bearing member mounted on the curb, a shaft member slidable and rotatable in said bearing member and carrying an unloading device movable transversely of the basket by shaft rotation, and one of said members being provided with a recess and the other with a longitudinally extending key entering and slidable in said recess, said key at intervals being provided with recesses and adapted where recessed to permit and where not recessed to prevent relative rotation between said members.

2. A centrifugal extractor, comprising a stationary curb, a rotatable basket having an inwardly extending ring, a bearing support mounted on the curb, a shaft slidable and rotatable in said support, an unloading device secured to said shaft and movable transversely of the basket by shaft rotation, interengaging parts one on said support and one on said shaft preventing rotation of said shaft in said support, said part on said shaft corresponding to a position of said unloading device radially inwardly in the plane of said ring, and said parts being in alinement parallel to the axis of said shaft when said device is in its radially inward position, whereby said parts then permit sliding of said shaft in said support.

3. A centrifugal extractor, comprising a stationary curb, a basket rotatable therein and provided with an inwardly extending ring, a bearing member supported on the curb, a shaft member slidable and rotatable in said bearing member and carrying an unloading device movable transversely of the basket by shaft rotation, said members being provided one with a slot portion and the other with a cooperating key portion both extending longitudinally and preventing relative rotation between said members when said device is opposite said ring, one of said portions being interrupted at spaced intervals to permit swinging motion of the unloading device when above or below the ring.

4. A centrifugal extractor, comprising a stationary curb, a basket rotatable therein and provided with a series of rings defining separate collecting zones along the basket wall, a bearing member mounted on the curb, a shaft member slidable and rotatable in said bearing member and carrying an unloading device movable transversely of the basket by shaft rotation, interlocking connections between said shaft and bearing members arranged to permit relative sliding movement but prevent relative rotative movement therebetween, said connections including a longitudinal key on one of said members, the other member having a collar provided with a recess in which said key slides, and said key at intervals having recesses to permit shaft rotation when the unloading device is opposite any collecting zone or outside of the basket.

5. A centrifugal extractor, comprising a stationary curb, a basket rotatable therein and provided with a series of rings defining separate collecting zones along the basket wall, a bearing member mounted on the curb, a shaft member slidable and rotatable in said bearing member and carrying an unloading device movable transversely of the basket by shaft rotation, interlocking connections between said shaft and bearing members arranged to permit relative sliding movement but prevent relative rotative movement therebetween, said connections including a longitudinal key on one of said members, the other member having a collar provided with a recess in which said key slides, said key at intervals having recesses to permit shaft rotation when the unloading device is opposite any collecting zone or outside of the basket, and said key at its upper end having a lateral extension which prevents advance of the collar to a position beyond said extension and thereby limits downward motion of said unloading device.

OSCAR W. JOHNSON.